G. M. EATON.
RESILIENT LINK.
APPLICATION FILED MAR. 9, 1908.
937,289.
Patented Oct. 19, 1909.
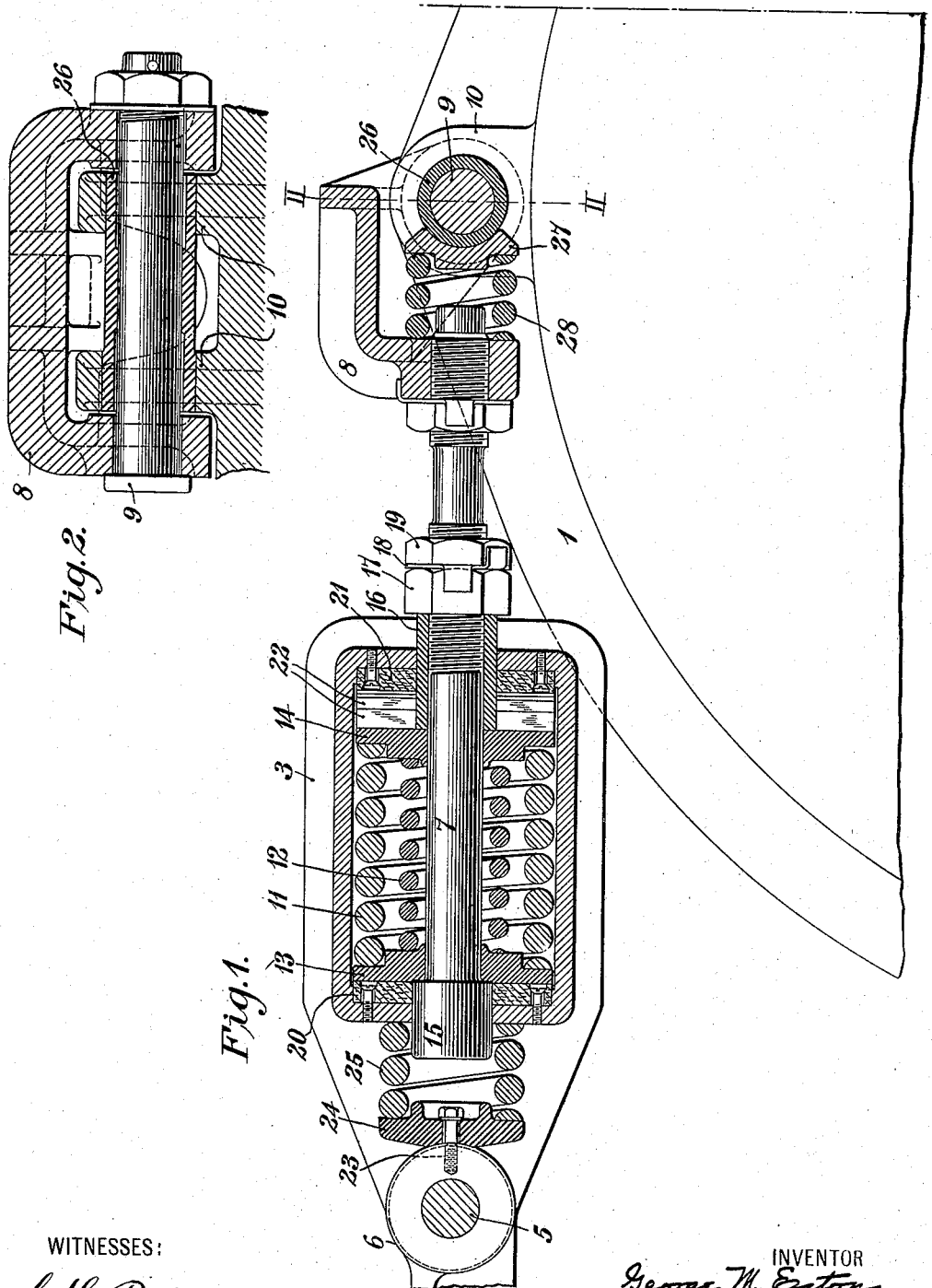
WITNESSES:
C. L. Belcher
Otto J. Schairer
INVENTOR
George M. Eaton
BY
Wesley G. Carr
ATTORNEY

UNITED STATES PATENT OFFICE.

GEORGE M. EATON, OF WILKINSBURG, PENNSYLVANIA, ASSIGNOR, BY MESNE ASSIGN-MENTS, TO WESTINGHOUSE ELECTRIC & MANUFACTURING COMPANY, OF EAST PITTSBURG, PENNSYLVANIA, A CORPORATION OF PENNSYLVANIA.

RESILIENT LINK.

937,289.  Specification of Letters Patent.  Patented Oct. 19, 1909.

Application filed March 9, 1908. Serial No. 420,059.

*To all whom it may concern:*

Be it known that I, GEORGE M. EATON, a citizen of the United States, and a resident of Wilkinsburg, in the county of Allegheny and State of Pennsylvania, have invented a new and useful Improvement in Resilient Links, of which the following is a specification.

My invention relates to resilient links, and particularly to such links as are employed to prevent rotation of the stationary members of electric motors and similar devices.

One object of my invention is to provide a link having such structural and operative characteristics as to effectually cushion the shocks and vibrations to which electric motors and similar devices are subjected, in order that the same may not be transmitted, or may be transmitted only with greatly reduced intensity, to other parts.

A further object of my invention is to prevent vibration and rattling at the connections between the link and other parts.

Figure 1 of the accompanying drawings is a view, in longitudinal section, of a device constructed in accordance with the present invention, and Fig. 2 is a transverse sectional view on the line II—II of Fig. 1.

The stationary member 1 of an electric motor or other device that is subjected to reactive torques or forces caused by the rotative movement of a coöperating member is prevented from rotation by means of a link comprising a substantially rectangular webbed frame 3 having its sides extended at one end and connected by means of a bolt 5 to a stationary sleeve 6, and a bolt or rod 7 that projects through the ends of the rectangular frame and is screw-threaded at one end to a clevis-like head 8 which is connected, by means of a bolt 9, to two spaced lugs 10 upon said stationary member.

Within the rectangular frame 3, and surrounding the rod 7, is a plurality of helical springs, here shown as two in number and designated as 11 and 12, that are clamped between two annular plates or washers 13 and 14 having seats for the ends of the springs. The plate 13 bears against a shoulder provided by a slight enlargement 15 of the end of the rod 7, and the plate 14 bears against the end of a sleeve 16 that surrounds the rod 7 and extends through one end of the rectangular frame 3, pressure being applied to the outer end of the sleeve 16 by means of a nut 17 that is screw-threaded upon the rod 7 and is normally prevented from rotation by means of a lock washer 18 and a lock nut 19.

Secured to the ends of the frame 3, and interposed between the same and the plates 13 and 14, are plates 20 and 21 of suitable resilient material, such as fiber, that supplement the action of the springs 11 and 12 in cushioning vibrations applied by the motor to the link, suitable washers or spacing plates 22 being also interposed between the plate 14 and the resilient plate 21 for the purpose of adjusting the normal degree of compression to which the springs are subjected.

The springs 11 and 12 are so constructed as to have different periods of vibration in order that shocks and impulses will be transmitted from one end to the other thereof in different periods of time, the dimensions of the springs for securing this result being determined experimentally. The effect of the springs thus constructed is to break up the shocks and impulses applied thereto in such a manner that, for each shock or impulse applied at one end of the springs, two or more successive shocks or impulses are transmitted to the spring seat at the opposite end of the springs, each of these latter shocks or impulses, of course, being of materially less intensity than that originally applied to the combined spring. Besides reducing the intensity of the shocks that are transmitted from one end of the link to the other, the springs are also so proportioned as to break up any regular vibrations the transmission of which to the other parts might cause serious sympathetic vibrations thereof.

Secured, by means of a tap bolt 23, to the stationary sleeve 6 is a seat 24 for a helical spring 25 that is maintained under heavy compression between the said seat and one end of the frame 3, the said spring thus serving to cause such a pressure to be exerted continuously between the bolt 5 and the sleeve 6 as to prevent relative vibration or rattling between the said parts.

At the other end of the link, the bolt 9 is surrounded by a sleeve 26 that is carried by the lugs 10 upon the stationary member of the motor. Bearing upon the central portion of the sleeve 26, between the lugs 10, is a seat 27 for a helical spring 28 that is also maintained under heavy compression and serves to cause pressure to be exerted continuously between the sleeve 26 and the bolt 9. The degree of compression under which the springs 25 and 28 are maintained exceeds the maximum force that may at any time be applied to the link, even after the parts of the connections have become somewhat worn, and there is, therefore, no possibility of vibration or rattling at the joints between the ends of the link and the other parts.

I claim as my invention:

1. The combination with a device adapted to exert varying forces, of a member opposing the said forces, and means for causing pressure to be exerted continuously between the device and the member which is independent and in excess of that caused by the said forces.

2. The combination with a device adapted to exert varying forces, of a member opposing the said forces and comprising a plurality of springs having different periods of vibration, and means for causing pressure to be exerted continuously between the device and the member which is independent of that caused by the said forces.

3. The combination with a device adapted to exert varying forces, of a member opposing the said forces and comprising a plurality of springs having different periods of vibration, and means for causing pressure to be exerted continuously between the device and the member which is independent of that caused by the said forces, the said means comprising a spring that is maintained under a greater degree of compression than the maximum capacity of the aforesaid springs.

4. A resilient link comprising a plurality of springs having different periods of vibration, and a supplementary resilient means.

5. A resilient link comprising a plurality of springs having different periods of vibration, and a plurality of supplementary resilient devices.

6. The combination with an electric motor having a field magnet frame so mounted as to be movable by electromagnetic torque, of a stationary member, two concentric helical springs of different strengths interposed between said frame and said member, and supplemental springs disposed between said frame and said member to exert a continuous pressure.

In testimony whereof, I have hereunto subscribed my name this 3rd day of March, 1908.

GEORGE M. EATON.

Witnesses:
HIRAM A. TAYLOR,
EDWARD L. WILDER.